US011592520B2

United States Patent
Meissner et al.

(10) Patent No.: US 11,592,520 B2
(45) Date of Patent: Feb. 28, 2023

(54) FMCW RADAR WITH INTERFERING SIGNAL SUPPRESSION IN THE TIME DOMAIN

(71) Applicant: Infineon Technologies AG, Neubiberg (DE)

(72) Inventors: Paul Meissner, Feldkirchen bei Graz (AT); Alexander Melzer, Neutillmitsch (AT); Christian Schmid, Linz (AT); Mate Andras Toth, Graz (AT)

(73) Assignee: Infineon Technologies AG, Neubiberg (DE)

( * ) Notice: Subject to any disclaimer, the term of this patent is extended or adjusted under 35 U.S.C. 154(b) by 360 days.

(21) Appl. No.: 16/703,658

(22) Filed: Dec. 4, 2019

(65) Prior Publication Data

US 2020/0191911 A1     Jun. 18, 2020

(30) Foreign Application Priority Data

Dec. 18, 2018 (DE) .......................... 102018132745.5

(51) Int. Cl.
*G01S 7/02* (2006.01)
*G01S 7/40* (2006.01)
(Continued)

(52) U.S. Cl.
CPC ............ *G01S 7/023* (2013.01); *G01S 7/4008* (2013.01); *G01S 7/4056* (2013.01);
(Continued)

(58) Field of Classification Search
CPC ...... G01S 7/023; G01S 7/4008; G01S 7/4056; G01S 13/931; G01S 13/003;
(Continued)

(56) References Cited

U.S. PATENT DOCUMENTS 10,969,463 B2 *  4/2021  Melzer ................. G01S 13/343
11,016,171 B2 *  5/2021  Melzer ................. G01S 13/931
(Continued)

OTHER PUBLICATIONS

Wagner et al., "Threshold-Free Interference Cancellation Method for Automotive FMCW Radar Systems," International Symposium on Circuits and Systems (ISCAS), May 2018, IEEE, 4 pages.

*Primary Examiner* — Donald H B Braswell
(74) *Attorney, Agent, or Firm* — Harrity & Harrity, LLP (57) ABSTRACT

A method is described below which can be used in a radar system. According to one example implementation, the method comprises providing a digital baseband signal using a radar receiver. The baseband signal comprises a plurality of segments, wherein each segment is assigned to a chirp of an emitted chirp sequence and each segment comprises a specific number of samples. For each signal sequence of n samples of the segments, where n in each case denotes a specific sample position within the respective segment, the method comprises the following: detecting interference-affected samples of the signal sequence; splitting the signal sequence into two or more sub-band signal sequences, wherein each sub-band signal sequence is assigned in each case to a frequency sub-band; replacing interference-affected samples in the two or more sub-band signal sequences in each case with a value which is based on adjacent samples in order to obtain corrected sub-band signal sequences; and determining a corrected signal sequence of n samples of the segments based on the corrected sub-band signal sequences.

20 Claims, 7 Drawing Sheets

(51) Int. Cl.
*G01S 13/931* (2020.01)
*G01S 13/00* (2006.01)

(52) U.S. Cl.
CPC ........... *G01S 13/931* (2013.01); *G01S 13/003* (2013.01); *G01S 2013/932* (2020.01)

(58) Field of Classification Search
CPC .... G01S 2013/932; G01S 7/352; G01S 7/356; G01S 13/343; G01S 13/42; G01S 13/584
See application file for complete search history.

(56) References Cited

U.S. PATENT DOCUMENTS

| | | | |
|---|---|---|---|
| 11,209,523 B2* | 12/2021 | Meissner | G01S 13/34 |
| 2006/0125682 A1* | 6/2006 | Kelly | G01S 13/931 |
| | | | 342/134 |
| 2016/0291130 A1* | 10/2016 | Ginsburg | G01S 7/40 |
| 2017/0010344 A1* | 1/2017 | Corbett | G01S 7/023 |
| 2018/0356495 A1* | 12/2018 | Moss | G01S 7/021 |

* cited by examiner

FMCW RADAR WITH INTERFERING SIGNAL SUPPRESSION IN THE TIME DOMAIN

CROSS REFERENCE TO RELATED APPLICATION

This application claims priority under 35 U.S.C. § 119 to German Patent Application No. 102018132745.5 filed on Dec. 18, 2018, the contents of which are incorporated by reference herein in their entirety.

TECHNICAL FIELD

The present description relates to the field of radar sensors, and to signal processing methods used in radar sensors which enable a suppression of disruptive interference.

BACKGROUND

Radar sensors are used in a number of applications for detecting objects, wherein the detection normally comprises the measurement of ranges and velocities of the detected objects. In the automotive sector in particular, there is a growing need for radar sensors which can be used, inter alia, in advanced driver assistance systems (ADAS) such as e.g. adaptive cruise control (ACC) or radar cruise control systems. Systems of this type can automatically adjust the speed of an automobile to maintain a safe distance from other automobiles driving in front (and from other objects and pedestrians). Other applications in the automotive sector are e.g. blind spot detection, lane change assist and the like. In the domain of autonomous driving, radar sensors play an important role in the control of autonomous vehicles.

Since automobiles are increasingly equipped with radar sensors, the probability of interference increases. This means that a radar signal emitted by a first radar sensor (built into a first vehicle) can scatter into the receive antenna of a second radar sensor (built into a second vehicle). In the second radar sensor, the first radar signal can interfere with an echo of the second radar signal and thereby impede the operation of the second radar sensor.

SUMMARY

A method is described below which can be used in a radar system. According to one example implementation, the method comprises providing a digital baseband signal using a radar receiver. The baseband signal comprises a plurality of segments, wherein each segment is assigned to a chirp of an emitted chirp sequence and each segment comprises a specific number of samples. For each signal sequence of n samples of the segments, where n in each case denotes a specific sample position within the respective segment, the method comprises the following: detecting interference-affected samples of the signal sequence; splitting the signal sequence into two or more sub-band signal sequences, wherein each sub-band signal sequence is assigned in each case to a frequency sub-band; replacing interference-affected samples in the two or more sub-band signal sequences in each case with a value which is based on adjacent samples in order to obtain corrected sub-band signal sequences; and determining a corrected signal sequence of n samples of the segments based on the corrected sub-band signal sequences.

A radar device is furthermore described. According to one example implementation, the device has a radar receiver which is designed to provide a digital baseband signal. The baseband signal comprises a plurality of segments, wherein each segment is assigned to a chirp of an emitted chirp sequence and each segment comprises a specific number of samples. The radar device further comprises a computing unit to which the digital baseband signal is fed and which is designed to carry out the above-mentioned method.

BRIEF DESCRIPTION OF THE DRAWINGS

Example implementations are explained in detail below on the basis of illustrations. The representations are not necessarily true-to-scale and the example implementations are not limited only to the aspects presented. Importance is attached instead to presenting the principles underlying the example implementations. In the drawings.

DETAILED DESCRIPTION

Figure 1:
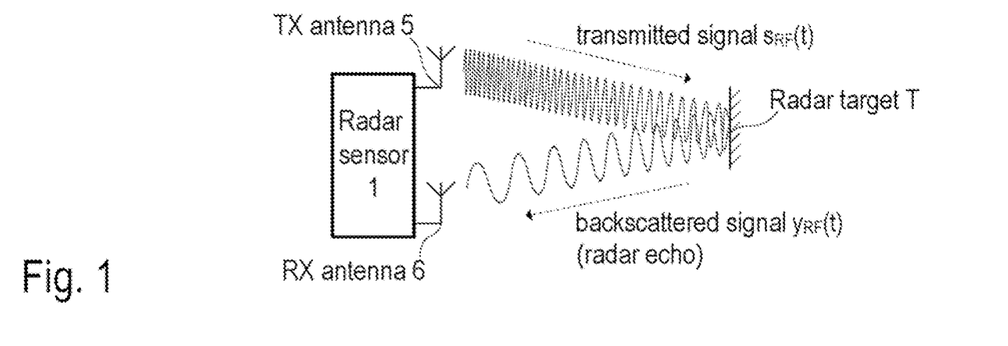
FIG. 1 is a diagram illustrating an FMCW radar system for range and/or velocity measurement.

FIG. 1 illustrates in a schematic diagram the use of a frequency-modulated continuous-wave radar system, usually referred to as an FMCW radar system, as a sensor for measuring ranges and velocities of objects which are normally referred to as radar targets. In the present example, the radar device 1 has separate transmit (TX) and receive (RX)

antennas 5 or 6 (bistatic or pseudo-monostatic radar configuration). It should be noted, however, that one or more antennas can also be used which simultaneously serve as transmit antennas and receive antennas (monostatic radar configuration). In the present example, the transmit antenna 5 emits a continuous radio-frequency (RF) signal $s_{RF}(t)$ which is frequency-modulated, for example, with a type of sawtooth signal (periodic, linear frequency ramp). In some implementations, the RF signal is within the frequency band between 76 and 81 GHz. The emitted signal $s_{RF}(t)$ is backscattered at the radar target T and the backscattered/reflected signal $y_{RF}(t)$ is received by the receive antenna 6. FIG. 1 shows a simplified example; in practice, radar sensors are systems equipped with a plurality of transmit (TX) and receive (RX) channels in order to be able also to define the Direction of Arrival (DoA) of the backscattered/reflected signal $y_{RF}(t)$ and thus locate the radar target T more precisely.

Figure 2:
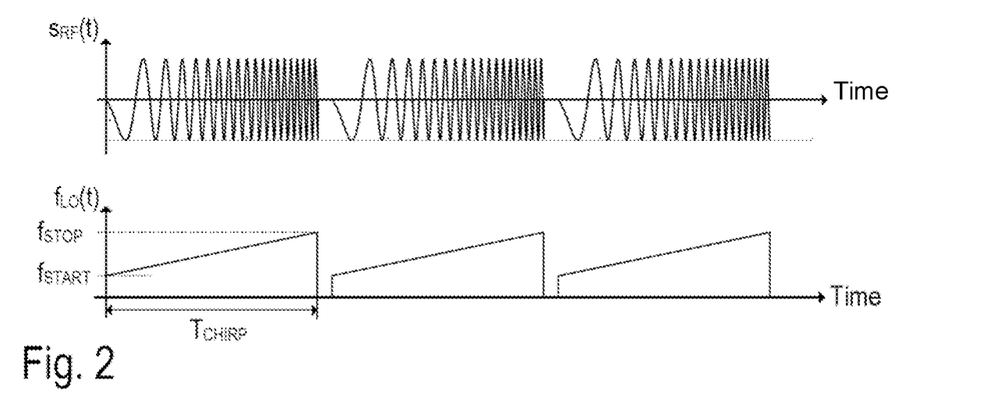
FIG. 2 comprises two time diagrams illustrating the frequency modulation (FM) of the radio-frequency (RF) signal generated by the FMCW radar system.

FIG. 2 illustrates by way of example the aforementioned frequency modulation of the signal $s_{RF}(t)$. As shown in FIG. 2 (upper diagram), the emitted RF signal $s_{RF}(t)$ is composed of a set of chirps, e.g. the signal $s_{RF}(t)$ comprises a sequence of sinusoidal signal characteristics (waveforms) with increasing frequency (up-chirp) or decreasing frequency (down-chirp). In the present example, the instantaneous frequency f(t) of a chirp increases beginning at a start frequency $f_{START}$ within a time period $T_{RAMP}$ linearly to a stop frequency $f_{STOP}$ (see lower diagram in FIG. 2). Such chirps are also referred to as linear frequency ramps. FIG. 2 shows three identical linear frequency ramps. It should be noted, however, that the parameters $f_{START}$, $f_{STOP}$, $T_{RAMP}$ as well as the pause between the individual frequency ramps may vary. The frequency variation also does not necessarily have to be linear (linear chirp). Depending on the implementation, transmit signals with exponential or hyperbolic frequency variation (exponential or hyperbolic chirps), for example, can also be used.

Figure 3:
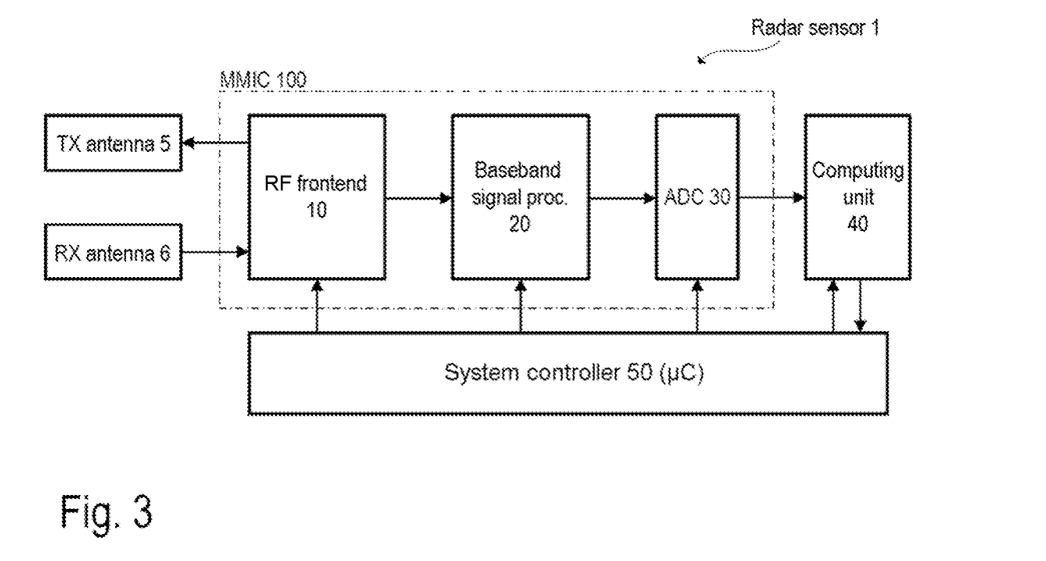
FIG. 3 is a block diagram illustrating the basic structure of an FMCW radar system.

FIG. 3 is a block diagram showing by way of example a possible structure of a radar device 1 (radar sensor). Accordingly, at least one transmit antenna 5 (TX antenna) and at least one receive antenna 6 (RX antenna) are connected to an RF frontend 10 integrated into a chip which can contain all those circuit components which are used for the RF signal processing. These circuit components comprise, for example, a local oscillator (LO), RF power amplifiers, low-noise amplifiers (LNA), directional couplers (e.g. rat-race couplers, circulators, etc.) and mixers for the down-conversion of the RF signals into the baseband or an intermediate frequency band (IF band). The RF frontend 10 may be integrated, possibly together with further circuit components, into a chip which is normally referred to as a monolithically microwave integrated circuit (MMIC). No further distinction is made below between the baseband and the IF band, and only the term baseband is used. Baseband signals are those signals based on which the detection of radar targets is performed.

The example shown shows a bistatic (or pseudo-monostatic) radar system with separate RX and TX antennas. In the case of a monostatic radar system, the same antenna would be used to both emit and receive the electromagnetic (radar) signals. In this case, a directional coupler (e.g. a circulator) can be used to separate the RF signals to be emitted from the received RF signals (radar echo signals). As mentioned, radar systems in practice usually have a plurality of transmit and receive channels with a plurality of transmit and receive antennas, which enables, inter alia, a measurement of the direction (DoA) from which the radar echoes are received.

In MIMO systems of this type (MIMO=multiple-input multiple-output), the individual TX channels and RX channels are normally in each case of the same or similar design.

In the case of an FMCW radar system, the RF signals emitted via the TX antenna 5 can be e.g. in the range from approximately 20 GHz to 100 GHz (e.g. around 77 GHz in some applications). As mentioned, the RF signal received by the RX antenna 6 comprises the radar echoes (chirp echo signals), e.g. those signal components which are backscattered at one or more radar targets. The received RF signal $y_{RF}(t)$ is e.g. down-converted into the baseband (or IF band) and is further processed in the baseband using analog signal processing (see FIG. 3, analog baseband signal processing chain 20). The aforementioned analog signal processing in the baseband essentially comprises a filtering and, if beneficial, an amplification of the baseband signal. The baseband signal is finally digitized (see FIG. 3, analog-digital converter 30) and further processed in the digital domain. The digital signal processing chain can be implemented at least partially as software which can be run on a processor, for example a microcontroller or a digital signal processor (see FIG. 3, computing unit 40). The entire system is normally controlled by a system controller 50 which can similarly be implemented at least partially as software which can be run on a processor such as e.g. a microcontroller. The RF frontend 10 and the analog baseband signal processing chain 20 (and optionally also the analog-digital converter 30 and parts of the computing unit 40) can be integrated jointly into a single MMIC (e.g. an RF semiconductor chip). Alternatively, the individual components can also be distributed among a plurality of integrated circuits.

Figure 4:
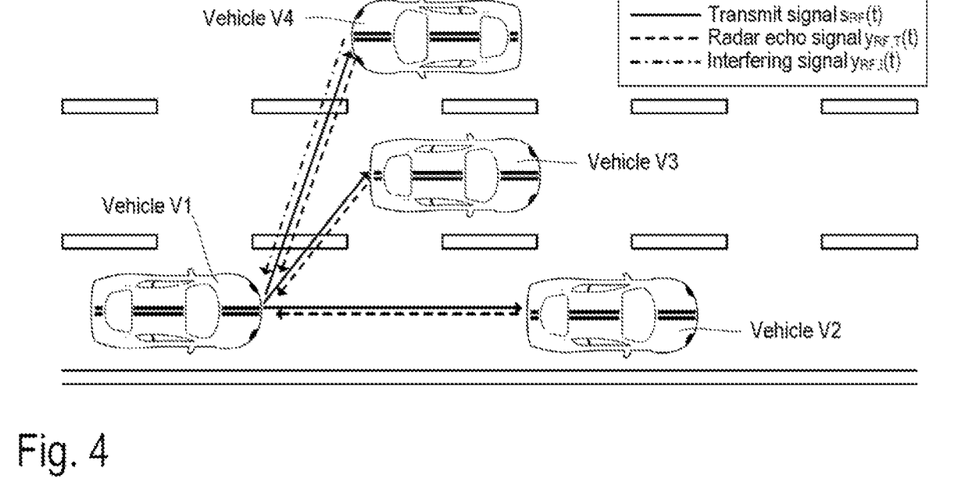
FIG. 4 is a diagram illustrating an example of how interfering signals can be scattered into the receive antenna of a radar sensor.

FIG. 4 illustrates a simple example showing how an interferer can interfere with the received radar echoes. FIG. 4 shows a road with three lanes and four vehicles V1, V2, V3 and V4. At least the vehicles V1 and V4 are equipped with radar sensors. The radar sensor of the vehicle V1 emits an RF radar signal $s_{RF}(t)$ and the received RF radar signal $y_{RF}(t)$ contains the radar echoes from the vehicles V2 and V3 driving in front and from the oncoming vehicle V4. The RF radar signal $y_{RF}(t)$ received by the radar sensor of the vehicle V1 further contains a radar signal (interfering signal) which has been generated by the radar sensor of the oncoming vehicle V4. The radar sensor of the vehicle V4 is an interferer for the radar sensor of the vehicle V1.

The signal $y_{RF}(t)$ received by the radar sensor of the vehicle V1 can be written as follows:

$$y_{RF}(t)=y_{RF,T}(t)+y_{RF,I}(t), \text{ where} \quad (1)$$

$$y_{RF,T}(t)=\Sigma_{i=0}^{U-1} A_{T,i} \cdot s_{RF}(t-\Delta t_{T,i}) \text{ and} \quad (3)$$

$$y_{RF,I}(t)=\Sigma_{k=0}^{V-1} A_{I,k} \cdot s_{RF,k}'(-\Delta t_{I,k}). \quad (3)$$

In the above equations (1) to (3), the signal components $y_{RF,T}(t)$ and $y_{RF,I}(t)$ of the received signal $y_{RF}(t)$ correspond to the radar echoes of real radar targets $T_i$ or the interfering signals. In practice, a plurality of radar echoes and a plurality of interferers may be present. Equation (2) therefore represents the sum of the radar echoes which are caused by U different radar targets $T_i$, where $A_{T,i}$ denotes the attenuation of the transmitted radar signal and $\Delta t_{T,i}$ denotes the round trip delay time (RTDT) for a specific radar target $T_i$. Equation (3) similarly represents the sum of the interfering signals which are caused by V interferers. Here, $A_{I,k}$ denotes the attenuation of the interfering signal $s_{RF,k}'(t)$ emitted by an interferer and $\Delta t_{I,k}$ denotes the associated signal transit time (for each interferer k=0, 1, ..., V−1). It should be noted that the radar signal $s_{RF}(t)$ emitted by the vehicle V1 and the interfering signal $s_{RF,0}'(t)$ emitted by the vehicle V4 (index k=0 for vehicle V4) will normally have different chirp sequences with different chirp parameters (start/stop frequency, chirp duration, repetition rate, etc.). The amplitude of the received interfering signal component $y_{RF,I}(t)$ can furthermore be significantly higher than the amplitude of the echo signal component $y_{RF,T}(t)$.

Figure 5:
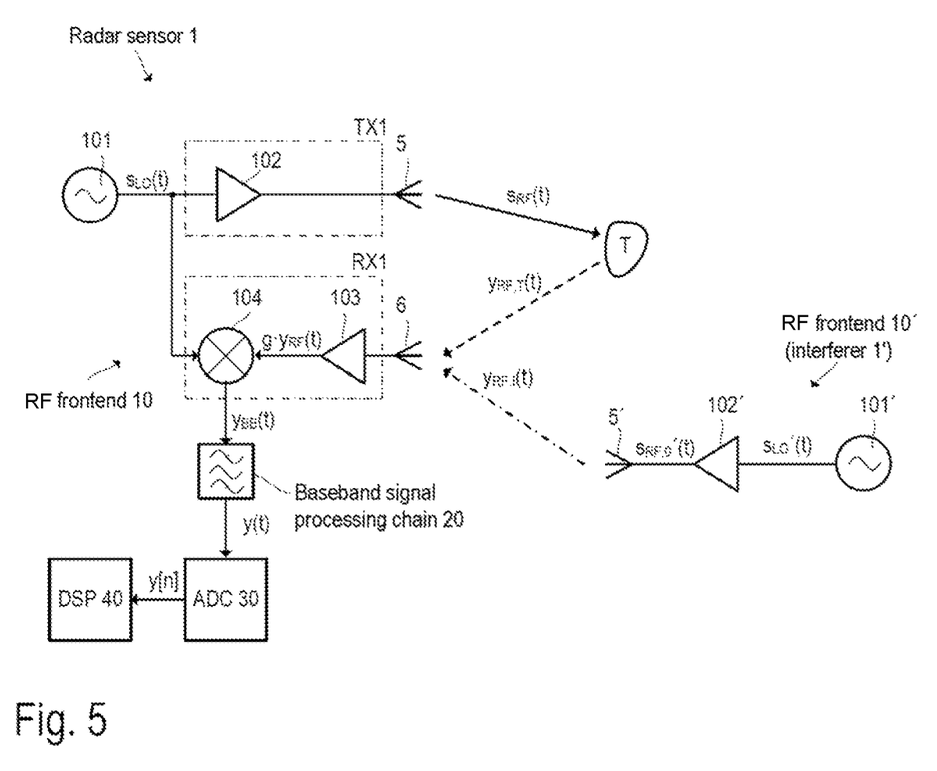
FIG. 5 is a circuit diagram illustrating a simplified example of a radar transceiver, and also a further radar transceiver which causes interference.

FIG. 5 illustrates in more detail an example implementation of a radar transceiver 1 according to the example from FIG. 3. In the present example, particularly the RF frontend 10 of the radar transceiver 1 and the RF frontend 10' of a different (interfering) radar sensor 1' are shown. It should be noted that FIG. 5 represents a simplified circuit diagram in order to indicate the basic structure of the RF frontend 10 with one transmit channel (TX channel) and one receive channel (RX channel). Actual implementations which may be highly dependent on the specific application are normally more complex and have a plurality of TX and/or RX channels.

The RF frontend 10 comprises a local oscillator 101 (LO) which generates an RF oscillator signal $s_{LO}(t)$. The RF oscillator signal $s_{LO}(t)$ is in operation, as described above with reference to FIG. 2, is frequency-modulated and is also referred to as an LO signal. In radar applications, the LO signal is usually in the SHF (Super High Frequency, centimeter wave) or in the EHF (Extremely High Frequency, millimeter wave) band, e.g. in the interval from 76 GHz to 81 GHz in some automobile applications. The LO signal $s_{LO}(t)$ is processed in both the transmit signal path TX1 (in the TX channel) and in the receive signal path RX1 (in the RX channel).

The transmit signal $s_{RF}(t)$ (cf. FIG. 2) which is emitted by the TX antenna 5 is generated by amplifying the LO signal $s_{LO}(t)$, for example using the RF power amplifier 102, and is therefore merely an amplified and possibly phase-shifted version of the LO signal $s_{LO}(t)$. The output of the amplifier 102 can be coupled with the TX antenna 5 (in the case of a bistatic or pseudo-monostatic radar configuration). The receive signal $y_{RF}(t)$ which is received by the RX antenna 6 is fed to the receiver circuit in the RX channel and therefore directly or indirectly to the RF port of the mixer 104. In the present example, the RF receive signal $y_{RF}(t)$ (antenna signal) is pre-amplified using the amplifier 103 (amplification g). The mixer 104 therefore receives the amplified RF receive signal $g \cdot y_{RF}(t)$. The amplifier 103 may, for example, be an LNA. The LO signal $s_{LO}(t)$ is fed to the reference port of the mixer 104 so that the mixer 104 down-converts the (pre-amplified) RF receive signal $y_{RF}(t)$ into the baseband. The down-converted baseband signal (mixer output signal) is denoted $y_{BB}(t)$. This baseband signal $y_{BB}(t)$ initially undergoes analog further processing, wherein the analog baseband signal processing chain 20 essentially causes an amplification and a (e.g. bandpass or low-pass) filtering in order to suppress unwanted sidebands and mirror frequencies. The resulting analog output signal which is fed to an analog-digital converter (see FIG. 3, ADC 30) is denoted y(t). Methods for the further digital processing of the digitized output signal (digital radar signal y[n]) are known per se (e.g. range-Doppler analysis) and are therefore not discussed in more detail here. However, some principles of the range-Doppler analysis will be explained further below with reference to FIG. 9.

In the present example, the mixer 104 down-converts the pre-amplified RF receive signal $g \cdot y_{RF}(t)$ (e.g. the amplified antenna signal) into the baseband. The mixing can take place in one stage (e.g. from the RF band directly into the baseband) or via one or more intermediate stages (e.g. from the RF band into an intermediate frequency band and further into the baseband). In this case, the receive mixer 104 effectively comprises a plurality of series-connected individual mixer stages. In view of the example shown in FIG. 5, it becomes clear that the quality of a radar measurement is highly dependent on the quality of the LO signal $s_w(t)$, for example on the noise contained in the LO signal $s_{LO}(t)$ which is quantitatively determined by the phase noise of the local oscillator 101.

FIG. 5 further shows a part (the TX channel of the RF frontend 10') of a further radar sensor 1' which represents an interferer for the radar sensor 1. The RF frontend 10' of the radar sensor 1' contains a further local oscillator 101' which generates an LO signal $s_{LO}'(t)$ which is amplified by the amplifier 102'. The amplified LO signal is emitted as the RF radar signal $s_{RF,0}'(t)$ via the antenna 5' of the radar sensor 1' (cf. Equation (3)). This RF radar signal $s_{RF,0}'(t)$ contributes to the interfering signal component $y_{RF,I}(t)$ received by the antenna 6 of the other radar sensor 1 and causes the aforementioned interference.

Figure 6:
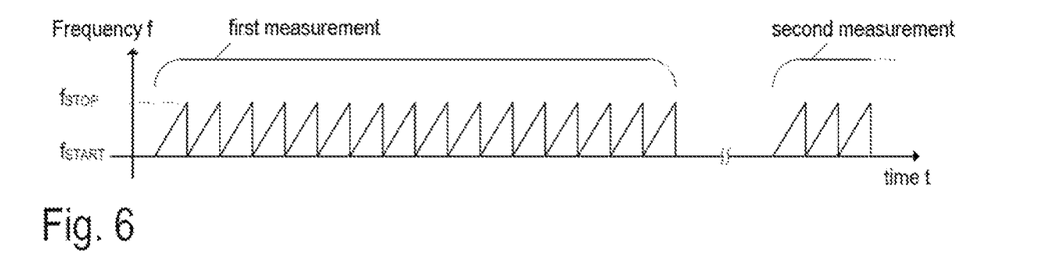
FIG. 6 shows an example of a transmitted radar signal with a plurality of sequences of chirps in a time diagram (frequency over time), wherein each sequence has a specific number of chirps which are used for a measurement.

FIG. 6 illustrates schematically an example of an FM scheme of the type normally used in FMCW radar sensors during the frequency modulation of the LO signal $s_{LO}(t)$. In the example shown, a sequence of chirps is generated for each measurement. In FIG. 6, the first sequence contains only 16 chirps. In practice, however, a sequence can have substantially more chirps, for example 128 or 256 chirps. A number corresponding to a power of two allows the use of efficient FFT (Fast Fourier Transform) algorithms in the subsequent digital signal processing (e.g. in the range-Doppler analysis). A pause may be provided between the individual sequences.

Figure 7:
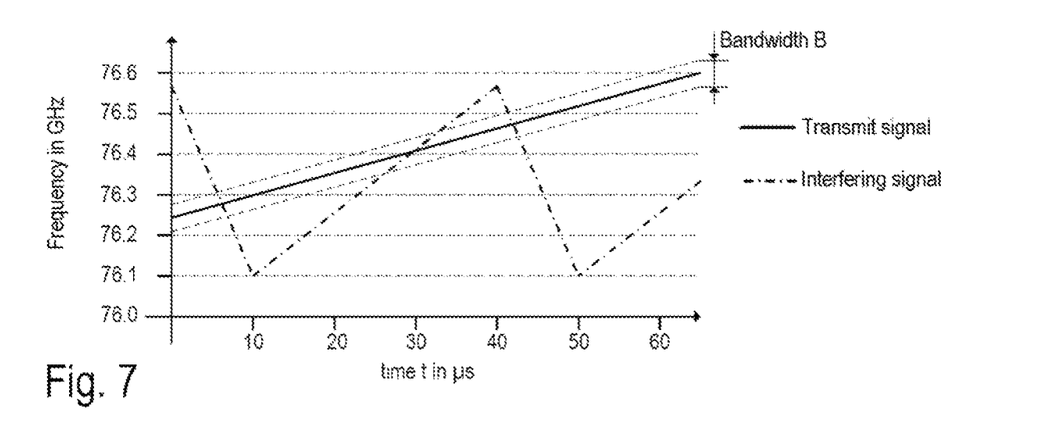
FIG. 7 shows a time diagram of a transmit signal of a radar sensor and a transmit signal causing the interference (interfering signal) of a further radar sensor (interferer), wherein the signal characteristics (frequency over time) of these signals partially overlap one another.
Figure 8:
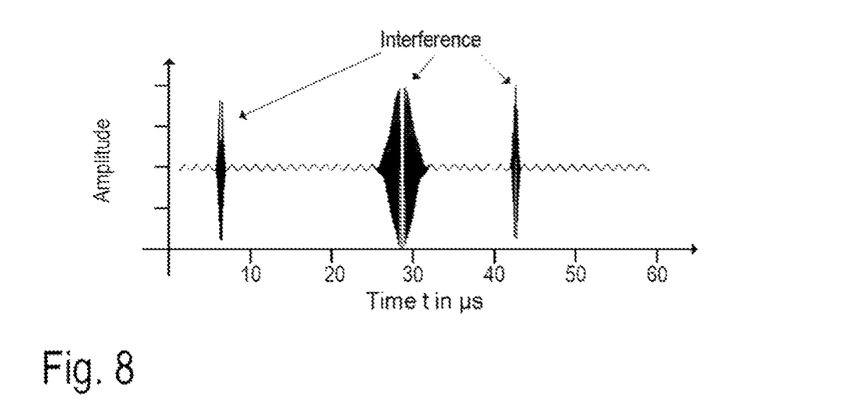
FIG. 8 shows a time diagram of an example of a signal characteristic of a radar signal (following conversion into the baseband) which contains a radar echo from a radar target and an interfering signal (interference).

FIGS. 7 and 8 illustrate with reference to an example how an interferer can interfere with the radar echoes which are contained in the RF signal $y_{RF}(t)$ received by the radar sensor 1. FIG. 7 shows in a diagram (frequency over time) a chirp emitted by the radar sensor 1 with a chip duration of 60 µs. The start frequency of the emitted signal $s_{RF}(t)$ is approximately 76250 MHz and the stop frequency approximately 76600 MHz. An interfering signal $y_{RF,I}(t)$ generated by a different radar sensor contains an up-chirp with a start frequency of approximately 76100 MHz, a stop frequency of approximately 76580 MHz and a chip duration of 30 µs, and also a subsequent down-chirp which starts at the stop frequency of the preceding chirp and ends at the start frequency of the preceding chirp and has a chip duration of 10 µs. The bandwidth B of the baseband signal of the radar sensor is essentially determined by the baseband signal processing chain 20 and is indicated in FIG. 7 by the broken lines. FIG. 8 shows an example of a signal characteristic of the (preprocessed) baseband signal y(t) of the radar sensor 1. It is evident that the signal components have a significant amplitude due to the interference in each time interval in which the frequency of the interfering signal lies within the bandwidth B of the radar sensor (see FIGS. 7 and 8). In the present example, the interference occurs three times during the chip duration of 60 µs, e.g. at approximately 7 µs, 28 µs and 42 µs. As mentioned, the power of the interfering signal may be higher than the power of the radar echoes from real targets. Furthermore, apart from the exceptions not considered here, the interfering signals and the transmit signal of the considered radar sensor 1 are uncorrelated and for this reason the interference can be regarded as noise (in the sense of a broadband interference) and thus increases the noise floor.

Figure 9:
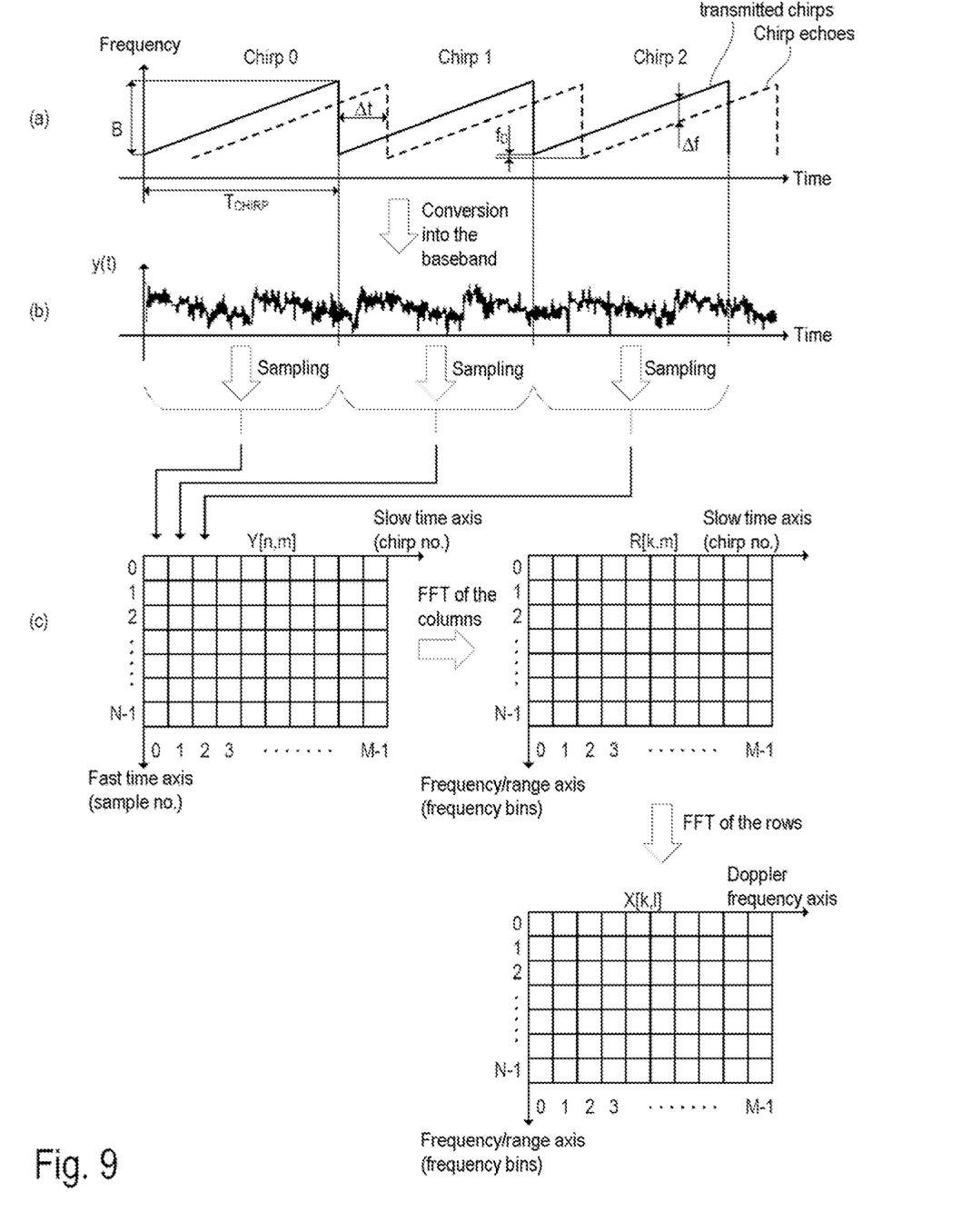
FIG. 9 illustrates by way of example the digital signal processing of radar signals in range-Doppler analysis.

The signal processing normally carried out in a radar sensor for the detection of radar targets will be summarized briefly below prior to a closer examination of the interfering signal suppression. FIG. 9 illustrates with reference to an example the analog signal processing in a radar sensor up until the digitization of the baseband signal which represents the chirp echo signals. Diagram (a) in FIG. 9 shows a part of a chirp sequence which comprises M linear chirps. The continuous line represents the signal characteristic (waveform, frequency over time) of the outgoing RF radar signal $s_{RF}(t)$ and the broken line represents the corresponding signal characteristic of the incoming radar signal $y_{RF}(t)$ which (if present) comprises the chirp echoes. According to diagram (a) in FIG. 9, the frequency of the outgoing radar signal increases, beginning at a start frequency $f_{START}$, linearly up to a stop frequency $f_{STOP}$ (chirp no. 0) and then drops back to the start frequency $f_{START}$, increases again to the stop frequency $f_{STOP}$ (chirp no. 1), and so on.

As previously explained with reference to FIG. 6, a chirp sequence comprises a plurality of chirps; in the present case, the number of chirps of a sequence is denoted M. Depending on the application, a sequence can also contain chirps with different parameters (start frequency and stop frequency, duration and modulation pause). During a modulation pause between two consecutive chirps, the frequency may, for example, be equal to the stop frequency of the preceding chirp or the start frequency of the following chirp (or equal to a different frequency). The chip duration can be in the range from a few microseconds to a few milliseconds, for example in the range from 20 μs to 2 ms. The actual values may be greater or smaller, depending on the application. The number M of chirps in a sequence can correspond to a power of two, e.g. M=256.

The incoming RF radar signal $y_{RF}(t)$ (e.g. received by the RX antenna) lags behind the outgoing RF radar signal $s_{RF}(t)$ (e.g. emitted by the TX antenna) by a time difference Δt. This time difference Δt corresponds to the signal transit time from the TX antenna to the radar target and back to the RX antenna and is also referred to as the round trip delay time (RTDT). The range $d_{T_i}$ of a radar target $T_i$ from the radar sensor is $d_{T_i} = c \cdot \Delta t / 2$, e.g. the speed of light c times half the time difference Δt. As shown in diagram (a) in FIG. 9, the time difference Δt results in a corresponding frequency difference Δt. This frequency difference Δf can be determined by mixing the incoming (and possibly pre-amplified) radar signal $y_{RF}(t)$ with the LO signal $s_{LO}(t)$ of the radar sensor (see FIG. 5, mixer 104), by digitizing the resulting baseband signal y(t) and by then performing a digital spectral analysis. The frequency difference Δf then appears in the spectrum of the digitised baseband signal y[n] as the beat frequency. If linear chirps are used, the time difference Δt can be calculated according to Δt=Δf/k, wherein the factor k denotes the steepness (hertz per second) of the frequency ramp which can be calculated according to $k = B/T_{CHIRP}$, where B is the bandwidth of a chirp ($B = |f_{STOP} - f_{START}|$). In view of the above explanations, the range $d_{T_i}$ of the target $T_i$ is therefore as follows:

$$d_{T_i} = c \cdot \Delta t / 2 = c \cdot \Delta f \cdot T_{CHIRP} / (2B), \quad (4)$$

Although the basic functional principle of an FMCW radar sensor has been summarized above, it should be noted that more sophisticated signal processing is normally used in practice. For example, an additional Doppler shift $f_D$ of the incoming signal can influence the range measurement due to the Doppler effect, which the Doppler shift $f_D$ is added to the frequency difference Δf explained above. Depending on the application, the Doppler shift can be estimated/calculated from the outgoing and incoming radar signals and can be taken into account in the measurement, whereas, in some applications, the Doppler shift may be negligible for the range measurement. This may be the case, for example, if the chip duration is high and the velocity of the target is low, so that the frequency difference Δf is great in comparison with the Doppler shift $f_D$. In some radar systems, the Doppler shift can be eliminated by determining the range in the range measurement based on an up-chirp and a down-chirp. The actual range $d_T$ can be calculated theoretically as the average value of the range values obtained from a measurement with up-chirps and a further measurement with down-chirps. The Doppler shift is eliminated by the averaging.

One example of a signal processing technique for processing FMCW radar signals comprises calculating range-Doppler maps, which are also referred to as range-Doppler images. FMCW radar sensors generally determine the target information (e.g. range, velocity, DoA) by transmitting a sequence of chirps (see FIG. 9, diagram (a)) and mixing the (delayed) echoes from the radar targets with a "copy" of the transmitted signal (cf. FIG. 5, mixer 104). The resulting baseband signal y(t) is shown in diagram (b) in FIG. 9. This baseband signal y(t) and consequently also the digitized baseband signal y[n] can be subdivided into a plurality of segments, wherein each segment of the baseband signal y[n] is assigned to a specific chirp of the chirp sequence.

The aforementioned target information can be extracted from the spectrum of the aforementioned segments of the baseband signal y[n] containing the chirp echoes generated by one or more radar targets. As explained in more detail below, a range-Doppler map is obtained, for example, using a two-step Fourier transform. Range-Doppler maps can be used as a basis for various methods for detecting, identifying and classifying radar targets. The result of the first Fourier transform step is referred to as a range map. The interfering signal suppression methods described here can be carried out in the spectra of the aforementioned segments of the baseband signal which are contained in a range map of this type.

In the examples shown here, the calculations for determining range-Doppler maps are carried out by a digital computing unit, such as e.g. a signal processor (cf. FIG. 5, DSP 40). In other example implementations, other computing units can also be used additionally or alternatively to a signal processor in order to carry out the calculations. Depending on the implementation, calculations can be carried out by various software and hardware entities or combinations thereof. The term computing unit can typically be understood to mean any combination of software and hardware which is able and designed to carry out the calculations described in connection with the example implementations explained here.

According to one example implementation, the calculation of a range-Doppler map comprises two steps, wherein a plurality of Fourier transforms are calculated in each step (e.g. using an FFT algorithm). According to the present example, the baseband signal y(t) (cf. FIG. 5) is sampled in such a way that, for a chirp sequence with M chirps, N×M sampling values (samples) are obtained, e.g. M segments, each having N samples. This means that the sampling time interval $T_{SAMPLE}$ is selected in such a way that each of the M segments (chirp echoes in the baseband) is represented by a sequence of N samples. As shown in diagram (c) in FIG. 9, these M segments can each be arranged into N samples in a two-dimensional field (array) Y[n, m] (radar data field). Each column of each field Y[n, m] represents one of the M considered segments of the baseband signal y(t), and the n-th row of the field Y[n, m] contains the n-th sample of the M chirps. The row index n (n=0, 1, . . . N−1) can therefore be considered as a discrete time n·$T_{SAMPLE}$ (within a chirp) on a "fast" time axis. The column index m (m=0, 1, . . . M−1) can equally be considered as a discrete time m·$T_{CHIRP}$ on a "slow" time axis. The column index m corresponds to the number of chirps in a chirp sequence.

In a first step, a first FFT (normally referred to as a range FFT) is applied to each chirp. The Fourier transform is calculated for each column of the field Y[n, m]. In other words, the field Y[n, m] is Fourier-transformed along the fast time access, and a two-dimensional field R[k, m] of spectra, referred to as a range map, is obtained as a result, wherein each of the M columns of the range map in each case contains N (complex-value) spectral values. The "fast" time axis becomes the frequency axis due to the Fourier transform; the row index k of the range map R[k, m] corresponds to a discrete frequency and is therefore also referred to as a frequency bin. Each discrete frequency corresponds to a range according to equation (4), and for this reason the frequency axis is also referred to as the range axis.

The range map R[k,m] is shown in diagram (c) in FIG. 9. A radar echo caused by a radar target results in a local maximum (peak) with a specific frequency index/frequency bin. This local maximum normally appears in all columns of the range map R[k, m], e.g. in the spectra of all considered segments of the baseband signal y[n] which can be allocated to the chirps of a chirp sequence. As mentioned, the associated frequency index k (e.g. according to equation (4)) can be converted into a range value.

In a second step, a second FFT (normally referred to as a Doppler FFT) is applied to each of the N rows of the range map R [k, m] (k=0, . . . , N−1). Each row of the range map R[k, m] contains M spectral values of a specific frequency bin, wherein each frequency bin corresponds to a specific range $d_{T_i}$ of a specific radar target $T_i$. The Fourier transform of the spectral values in a specific frequency bin (assignable to a radar target) enables the determination of the associated Doppler shift $f_D$ which corresponds to a velocity of the radar target. In other words, the two-dimensional field R[k, m] (the range map) is Fourier-transformed row-by-row, e.g. along the "slow" time axis. The resulting Fourier transforms again form a field with N×M spectral values, referred to as a range-Doppler map X[k, l] (k=0, . . . , N−1 and l=0, . . . , M−1). The "slow" time axis becomes the Doppler frequency axis due to the second FFT. The associated discrete Doppler frequency values correspond in each case to a specific velocity. The Doppler frequency axis can be converted accordingly into a velocity axis. In the examples described here, the dimensions of the matrices Y[n, m], R[k, m] and X[k, l] are equal to N×M. However, this is not necessarily the case. Depending on the implementation, the matrix Y[n, m] can be extended (virtually) using zero padding so that the range map R[k, m] has a dimension N'×M where N'>N.

Figure 10:
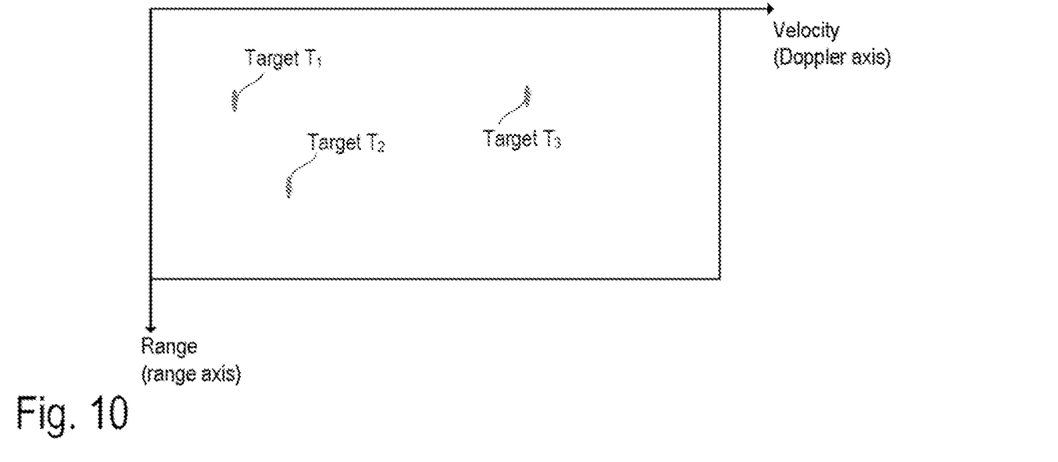
FIG. 10 illustrates by way of example the detection of radar targets in a range-Doppler map.

Each local maximum (each peak) in the range-Doppler map X[k, l] indicates a potential radar target. The row index k assigned to a local maximum (on the range axis) represents the range of the target, and the column index l assigned to the local maximum (on the velocity axis) represents the velocity of the target. FIG. 10 illustrates a range-Doppler map graphically as a contour plot in which the amounts of the values contained in the range-Doppler map X[k, l] are represented by level lines or by color-coding. The aforementioned local maxima and the associated range and velocity values can be easily identified in a contour plot of this type. The algorithms used in real radar systems for detecting the local maxima (peak detection algorithms) in a range-Doppler map are known per se and will not be further explained here. The CFAR algorithm (CFAR=constant false alarm rate) can be cited here merely as an example.

Depending on the application, more complex and more extensive algorithms can be used to evaluate the range-Doppler map. In some applications, the calculation of a range-Doppler map is not necessary. In these cases, ranges and velocities of radar targets can be calculated e.g. based on the range map without a range-Doppler map having to be previously calculated.

In the case of a plurality of RX antennas, a range map and a range-Doppler map $X_a$[k, l] can be calculated for each RX channel, where a denotes the number of the antenna and of the associated RX channel. The range-Doppler maps $X_a$[k, l] can be "stacked" into a three-dimensional field. The output data Y[n, m] (radar data fields) can equally be considered as a three-dimensional field. This is sometimes referred to as a radar data cube. Combinations in each case of an RX channel and a TX channel can form virtual channels, wherein a range map and a range-Doppler map can be calculated for each virtual channel and for each chirp sequence. The associated signal processing and beamforming methods for forming virtual channels are known per se.

As mentioned, the radar data cubes, the resulting range maps $R_a$[k, m] or the range-Doppler maps $X_a$[k, l] can be used as input data for various further signal processing methods. As mentioned, various peak detection algorithms are known for detecting local maxima (peaks) in the range maps $R_a$[k, m] or the range-Doppler maps $X_a$[k, l] which are caused by an object (radar target) in the "field of view" of the radar sensor. Other algorithms serve e.g. to calculate the (azimuth) angle of a radar targets or to classify detected radar targets (e.g. whether a radar target is a pedestrian).

As with all measurement data, the spectral values in a range map or a range-Doppler map contain noise. The detectability of the aforementioned local maxima and the reliability of the detection depend on the noise floor of the radar system. Various noise sources can contribute to the noise floor, in particular the phase noise of the local oscillator (see FIG. 4, LO 101). The interference effects discussed above due to other, interfering radar sensors can have a negative impact on the detection of radar targets and on the robustness and reliability of the measurement results. The aforementioned interference can increase the noise floor at least temporarily to such an extent that a detection of radar targets becomes impossible or at least susceptible to error.

Various techniques are known for detecting interference. These techniques make it possible to detect that a measurement has been affected by interference and the measurement results are therefore unreliable. Other approaches aim to suppress the noise signals or reduce them using filter techniques. The example implementations described below relate to a possible approach for suppressing interfering signal components (cf. equation (3)), signal $y_{RF,i}(t)$ using a special filter technique already in the time domain (e.g. before a Fourier transform into the frequency domain is performed).

Figure 11:
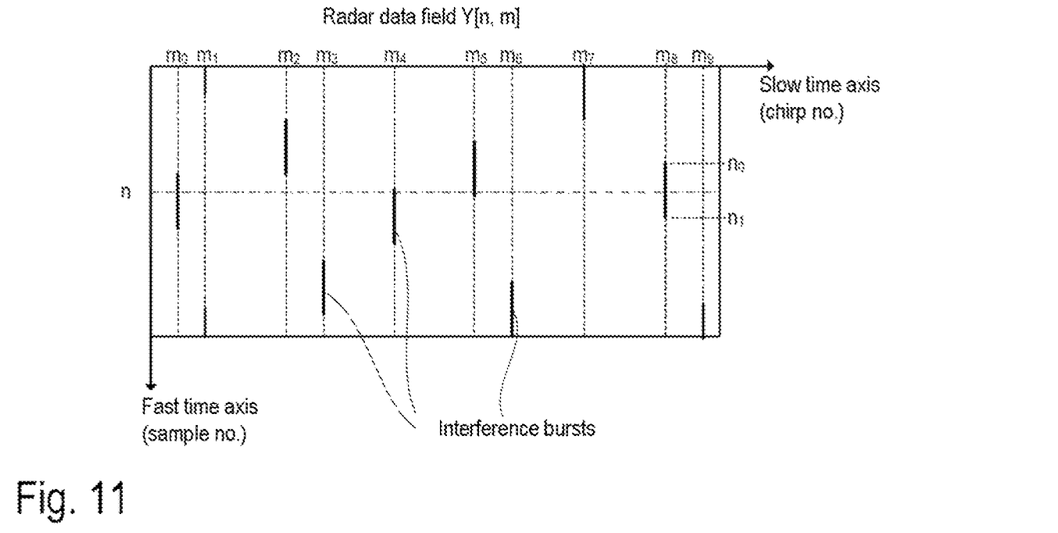
FIG. 11 illustrates the impact of interference on the digitized radar signal.

FIG. 11 illustrates, similarly in a contour plot, the impact of interference-induced disturbances (interference bursts), such as those shown e.g. in FIGS. 7 and 8, in the radar data field Y[n, m]. If a specific chirp is examined, e.g. the chirp with the index m=$m_8$, groups with a plurality of consecutive samples (e.g. in the index range from $n_0$ to $n_1$) along the fast access may then be errored (corrupted) due to the aforementioned interference-induced disturbances, wherein the amount (magnitude) of the errored samples concerned is normally significantly higher than the amount of the samples not affected by interference.

However, if the n-th sample (index n) of each chirp along the slow time axis is considered, e.g. the digital signal sequence $$y_n[m] \stackrel{\text{def}}{=} Y[n,m], \tag{5}$$

only individual samples, but not groups comprising a plurality of immediately consecutive samples, are then affected by the interference in this signal sequence $y_n[m]$ in the normal case. In FIG. 11, the samples of the signal sequence $y_n[m]$ of n samples are located along the dashed-dotted line (where n denotes the sample position within the segments).

The approaches described below for suppressing the interference-induced disturbances aim to replace the individual samples which have been defined as errored (corrupted) in the signal sequences $y_n[m]$ of a radar data field (for n=0, ..., N−1) with an approximation of the "true" value. This approximation can be calculated e.g. using interpolation based on the (e.g. immediately) adjacent samples. The chirps in which interference-induced disturbances occur are identified before the aforementioned approximation, which can be achieved, for example, using a comparison with a threshold value. The result of this identification is a list of indices of chirps with errored samples, in the example from FIG. 11 this is e.g. $\{m_0, m_1, m_2, m_3, m_4, m_5, m_6, m_7, m_8, m_9\}$ plus the associated index values on the fast time axis.

Figure 12:
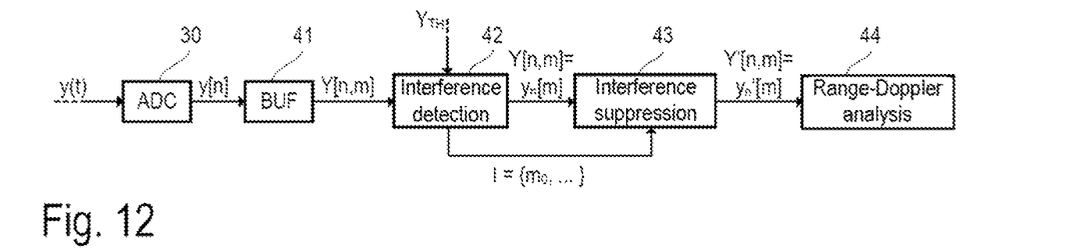
FIG. 12 illustrates the suppression of interference-induced disturbances in the radar signal in the time domain before the performance of the range-Doppler analysis.

Prior to a more detailed explanation of various examples of approximation, the signal processing chain from the analog-digital conversion through to the range-Doppler analysis will be explained in detail based on the example block diagram from FIG. 12. FIG. 12 essentially illustrates the preprocessing of a radar data field Y[n, m] in the time domain prior to the transformation into the frequency domain in the course of the range-Doppler analysis.

The signal processing chain shown in FIG. 12 comprises an analog-digital converter 30 (ADC), as shown, for example, in FIG. 5. As explained above, the output signal y[n] of the ADC 30 is a digitized output signal of a radar receive channel and can contain real radar echoes and interference-induced disturbances. Since the following signal processing is performed block-by-block, the digital signal y[n] is fed to a buffer 41 which is designed to buffer a plurality of segments of the digital signal y[n]. The buffered segments can be regarded as a radar data field Y[n, m], wherein Y[n, u] represents the u-th segment. Each segment corresponds to precisely one chirp of a chirp sequence emitted by the radar sensor (see FIG. 6). The radar data field Y[n, m] therefore corresponds to a transmitted chirp sequence on the basis of which radar targets are to be detected (e.g. using range-Doppler analysis) later (cf. FIGS. 9 and 10).

A detection algorithm is applied to the radar data field Y[n, m] in order to identify samples which are corrupted, e.g. due to interference-induced disturbances. As already mentioned, these corrupted samples can be detected using a comparison with a threshold value, e.g. a specific sample is detected as corrupted if its magnitude |Y[n, m]| or its energy or a different suitable criterion exceeds a specific threshold value. The energy of a sample can be represented e.g. by $Y[n, m]^2$.

According to the examples described here, the radar data field is processed row-by-row, e.g. the digital signal sequences $y_n[m]=Y[n, m]$ (see equation (5)) are processed separately (for n=0, ..., N−1). The signal sequences can be processed sequentially or (at least partially) parallelized. In FIG. 12, the interference detection is represented by the function block 42. For each signal sequence $y_n[m]$, the interference detection supplies, for example, a set of indices $$I=\{i\} \| |y_n[i]|>Y_{TH} \tag{6}$$

for which the associated samples $y_n[i]$ have been detected as errored, e.g. affected by interference. The indices I represent those positions on the slow time axis at which an interference-induced disturbance has been identified.

The function block 43 represents the suppression/elimination of the interference-induced disturbances (interference mitigation) using approximation of the (unknown) true value. In other words, the samples $y_n[i]$ identified as errored are replaced with an approximation $y_n'[i]$ (for all i∈I, see equation (6)). As mentioned, this interference suppression is carried out for each signal sequence $y_n[m]$ (e.g., for n=0, ..., N−1). The resulting corrected signal sequences $y_n'[m]$ form the corrected radar data field Y'[n, m] on the basis of which, for example, a range-Doppler analysis (function block 44) can then be carried out for the detection of radar targets.

As shown in FIG. 11, errored samples occur only in isolated cases in the signal sequences $y_n[m]$ (e.g. along the slow time axis), whereas interference-induced disturbances extend over a plurality of consecutive samples along the fast time axis. The n-th signal sequence $y_n[m]$ is considered below, wherein the set $I=\{m_0, m_4, m_8\}$ indicates the samples detected as errored (cf. FIG. 6). If a real radar echo is contained in this signal sequence $y_n[m]$, this signal sequence (assuming the absence of disturbances or noise) indicates a sinusoidal signal form (waveform), e.g.

$$y_n[m]=A \cdot \sin(\omega T_S m + \varphi), \tag{7}$$

wherein the assumptions A=1 and $\varphi$=0 can be made for the following discussion without loss of generality. The parameter $T_S$ denotes the sampling time interval. The sample $y_n[m_0]$ corrupted due to interference-induced disturbances can now be approximated as follows:

$$y_n[m_0] \approx y_n'[m_0] = \frac{c}{2}(y_n[m_0-1] + y_n[m_0+1]). \tag{8}$$

This means that the approximation $y_n'[m_0]$ is calculated as the scaled (scaling factor c) mean value of the immediately adjacent (and interference-unaffected) samples $y_n[m_0-1]$ and $y_n[m_0+1]$.

In order to calculate the scaling factor c, equations (7) and (8) are combined (with A=1 and $\varphi$=0) and the following is obtained:

$$y_n'[m_0] = \sin(\omega T_S m_0) = \frac{c}{2}(\sin(\omega T_S(m_0-1)) + \sin(\omega T_S(m_0+1))). \tag{9}$$

With the addition theorem for the sine function, equation (9) can be simplified as follows:

$$y_n'[m_0] = \sin(\omega T_S m_0) = \frac{c}{2} \cdot 2 \cdot \sin(\omega T_S m_0)\cos(\omega T_S). \tag{10}$$

The scaling factor c can be calculated from the above result (equation (10)), and the following is obtained:

$$c=\cos(\omega T_S)^{-1}. \tag{11}$$

This means that (with a given sampling time interval $T_S$) the scaling factor c depends on the angular frequency ω of the signal sequence $y_n[m]$.

It should be emphasized at this juncture that the approximation according to equation (8) is not the only possible approximation. More complex approximations based on more than two adjacent samples are also possible. Moreover, the immediately adjacent samples do not necessarily have to be used to calculate the approximation. For example, $$y_n[m_0] \approx \frac{c}{2}(y_n[m_0-2] + y_n[m_0+2]) \quad (12)$$

would also be a possible alternative approximation in which the immediately adjacent samples are not used for the calculation. In this case, the scaling factor c is adjusted accordingly.

One finding from the above analysis is that the scaling factor c used in the approximation is frequency-dependent. This applies regardless of the specific method used to calculate the approximation. The frequency in turn depends on the velocity of the radar target and is consequently a priori unknown. In order to be able to calculate the approximation (e.g. according to equation (8)), the velocity of the radar target would already have to be known, but this is not normally the case at this stage in the processing (before the Fourier transform). In order to solve this problem, according to the example implementations described here, the signal sequences $y_n[m]$ are split into a plurality of sub-bands using a filter bank for the purpose of calculating the approximation. This splitting (decomposition) provides a corresponding number of sub-band signal sequences $y_{n,s}[m]$, wherein s denotes the respective sub-band (s=1, 2, . . . ). A center frequency can be assigned to each sub-band. Adjacent sub-bands can adjoin or slightly overlap one another. The filters of the filter bank are normally designed in such a way that the upper limit frequency (cut-off frequency) of one sub-band is equal to the lower limit frequency of the next sub-band. Together, the sub-bands can cover the entire baseband (in relation to the slow time axis, e.g. the Doppler frequency domain) of the radar system. In one example implementation, the signal sequences sub-band signal sequences $y_n[m]$ are split in each case into sixteen sub-band signal sequences $y_{n,s}[m]$. The specific number of sub-bands depends on the respective application and can also be smaller or larger than sixteen.

The approximation discussed above of samples which are errored due to interference is carried out separately for each sub-band signal sequence $y_{n,s}[m]$, wherein it is assumed for the purpose of the approximation that the associated sub-band signal sequence $y_{n,s}[m]$ in each sub-band comprises only one single constant frequency $\omega=\omega_S$. This frequency $\omega_S$ may, for example, be the center frequency of the respective sub-band. This is not necessarily the case, but the frequency $\omega_S$ will depend on the sub-band considered (e.g. on the position of the center frequency of the respective sub-band within the bandwidth of the baseband) and will be different in each considered sub-band. A systematic error obviously occurs in the approximation if the actual frequency of a sub-band signal sequence $y_{n,s}[m]$ which is dependent on the velocity of a radar target is not equal to the frequency $\omega_S$ of the respective sub-band. However, in the case of sufficiently narrow sub-bands, this systematic error is small and negligible.

As mentioned, the approximation discussed above (see equation (8)) is carried out separately for each sub-band signal sequence $y_{n,s}[m]$; a corrected sub-band signal sequence $y_{n,s}'[m]$ is thus obtained for each sub-band. The corrected signal sequence $y_n[m]$ can be determined based on these corrected sub-band signal sequences $y_{n,s}'[m]$. In one simple example implementation, the corrected sub-band signal sequences $y_{n,s}'[m]$ are simply added together, e.g.

$$y_n'[m]=y_{n,1}'[m]+\ldots+y_{n,S}'[m], \quad (13)$$

where S denotes the number of sub-bands. In a different example implementation, only those sub-band signal sequences $y_{n,s}'[m]$ which have a sufficient signal energy are considered as a summand. If the signal energy lies below a threshold value, it can be assumed that no radar echo is contained in any case in this sub-band. Depending on the implementation, the corrected sub-band signal sequences $y_{n,s}'[m]$ can also be combined in a different manner to form the corrected signal sequence $y_n'[m]$ (e.g., using a further filter bank).

Figure 13:
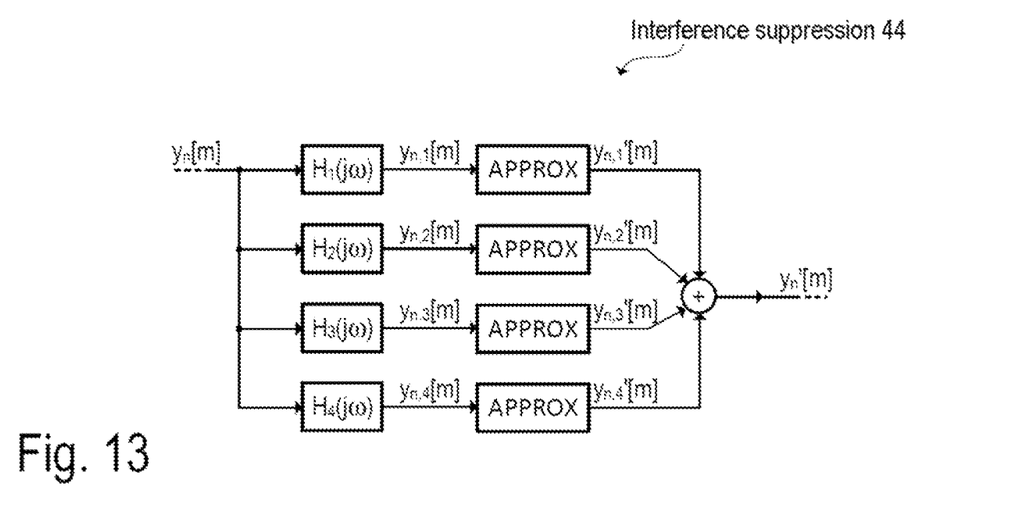
FIG. 13 illustrates, by way of example with reference to a block diagram, an example of a method for suppressing interference-induced disturbances in a digital radar signal.

FIG. 13 illustrates the approach described above based on a simplified example with a filter bank with only four filters (S=4). In the example shown, the filter bank comprises four filters with the transmission functions $H_1(j\omega)$, $H_2(j\omega)$, $H_3(j\omega)$ and $H_4(j\omega)$. The filter $H_1(j\omega)$ in the lowest sub-band can be a low-pass filter; the filter $H_4(j\omega)$ in the highest sub-band can be a high-pass filter. The intermediate filters $H_2(j\omega)$ and $H_3(j\omega)$ can be bandpass filters. In one example implementation, the filters $H_1(j\omega)$, $H_2(j\omega)$, $H_3(j\omega)$ and $H_4(j\omega)$ are implemented as FIR filters or IIR filters (FIR=Finite Impulse Response, IIR=Infinite Impulse Response). However, other types of filters are also applicable. The output signals of the individual filters of the filter bank are the sub-band signal sequences $y_{n,1}[m]$, $y_{n,2}[m]$, $y_{n,3}[m]$, and $y_{n,4}[m]$ in which the samples identified as errored are replaced in each case with an approximation (cf. equation (8)). The resulting corrected sub-band signal sequences $y_{n,1}'[m]$, $y_{n,2}'[m]$, $y_{n,3}'[m]$ and $Y_{n,4}'[m]$ can, as mentioned, be added together in order to obtain the corrected (baseband) signal sequence $y_n^i[m]$. As explained with reference to FIG. 11, the N corrected signal sequences $y_n'[m]$ of a radar data field can be recombined to form a corrected radar data field $Y'[n,m]$ and can be further processed in a known manner.

Figure 14:
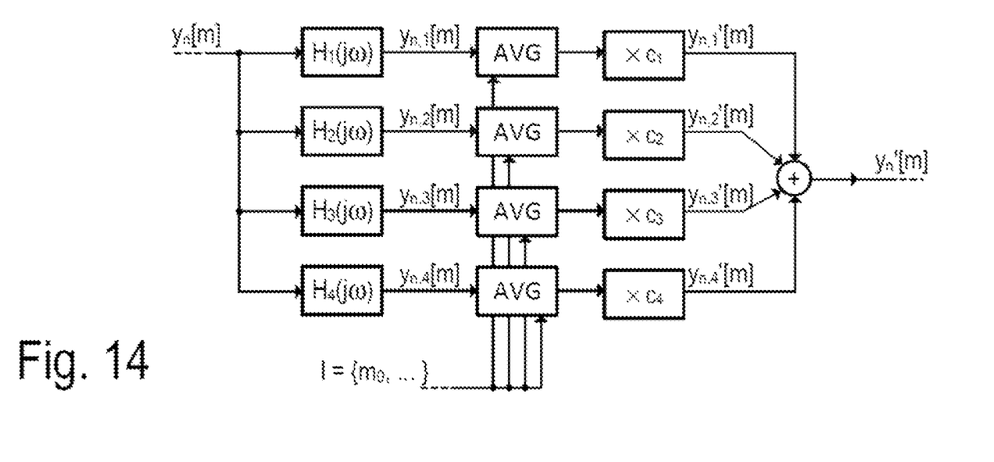
FIG. 14 illustrates an example implementation of the general example from FIG. 13.

FIG. 14 illustrates a possible implementation of the general structure from FIG. 12. According to the example from FIG. 13, an interpolation according to equation (8) is used as an approximation. This means that each sample previously identified as errored (cf. FIG. 11, block 42) is replaced with the mean value of the two immediately adjacent samples, and the mean value is scaled with the scaling factor $c_s$ (for s=1, 2, 3, 4), where $c_s$ is a constant parameter for each sub-band which is dependent on the respective sub-band (e.g. on its center frequency $\omega_s$). The corrected sub-band signal sequences $y_{n,1}'[m]$, $y_{n,2}'[m]$, $y_{n,3}'[m]$ and $y_{n,4}'[m]$ can be combined (e.g. added together) as shown in FIG. 13.

Figure 15:
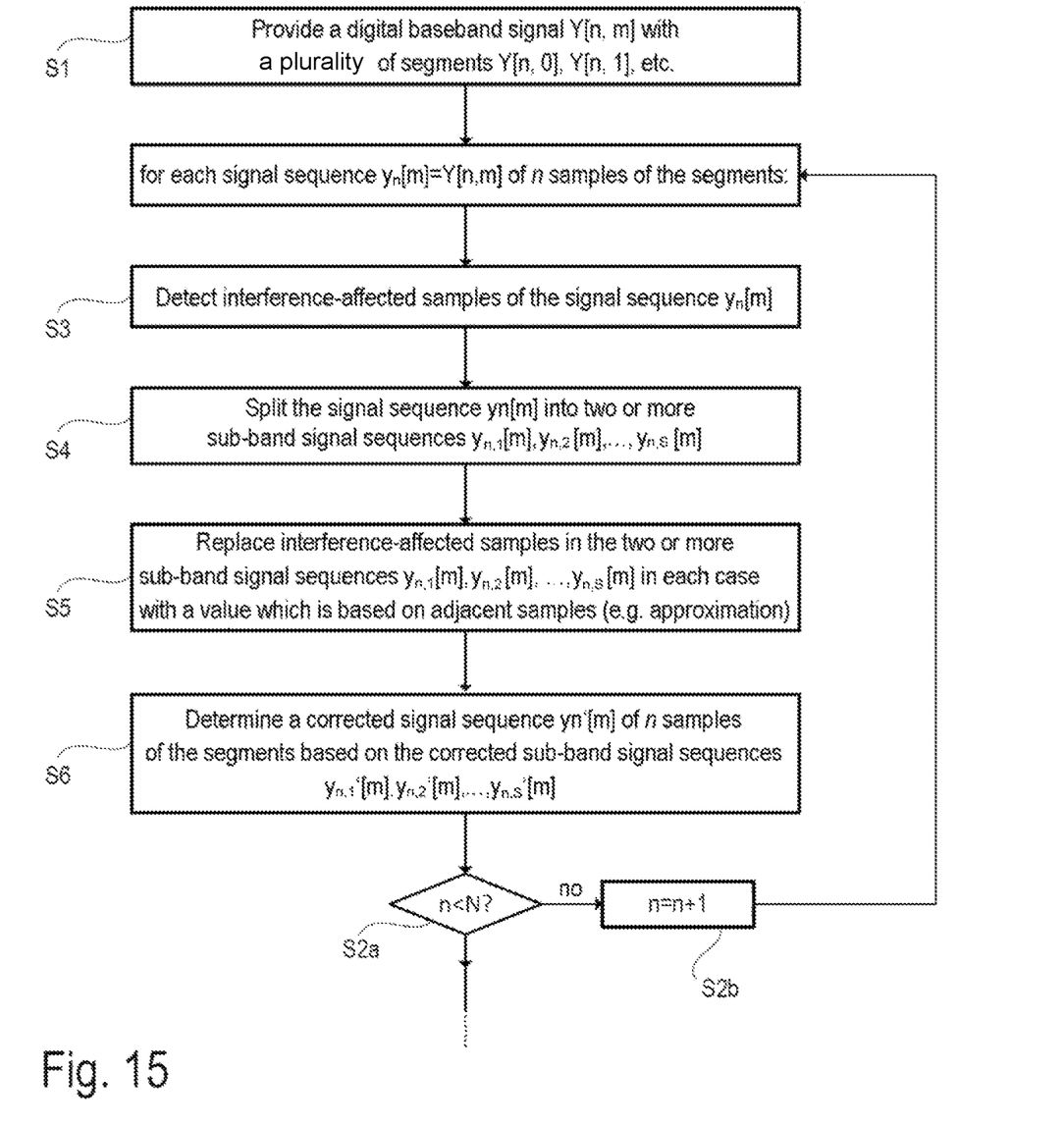
FIG. 15 illustrates, with reference to a flow diagram, an example of a method for suppressing interference-induced disturbances in the radar signal in the time domain.

An example implementation of the concept described here for suppressing interference-induced disturbances in the time domain is described below with reference to the flow diagram shown in FIG. 15. The method accordingly comprises providing a digital baseband signal using a radar receiver (see FIG. 15, step S1). The baseband signal can comprise a plurality of segments, wherein each segment is assigned to a chirp of an emitted chirp sequence and each segment comprises a specific number of samples. The segments of the baseband signal can be organized, for example, in the form of a matrix $Y[n, 0]$, wherein the aforementioned segments Y[n, 0], . . . , Y[n, M−1]) are represented by the columns of the matrix (cf. FIG. 10) (Y[n, 0], . . . , Y[n, M−1]). The following steps are carried out for each signal sequence $y_n[m]=Y[n, m]$ of n samples of the aforementioned segments, where n in each case denotes a specific sample position within the respective segment. The steps S2a and S2b relate to the monitoring of the loop condition n<N and the incrementation of the index n. The interference-affected samples are detected accordingly in the respective signal sequence $y_n[m]$ (see FIG. 15, step S3, cf. also FIG. 12, interference detection 42). The respective signal sequence $y_n[m]$ is then split into two or more sub-band signal sequences $y_{n,1}[m], \ldots, y_{n,S}[m]$ (see FIG. 15, step S4, see also FIG. 13 and FIG. 14). Each sub-band signal sequence is assigned in each case to a frequency sub-band. In the two or more sub-band signal sequences $y_{n,1}[m], \ldots, y_{n,S}[m]$, interference-affected samples are replaced in each case with a value which is based on adjacent samples (e.g. an approximation value or an interpolated value according to equation (8)), as a result of which corrected sub-band signal sequences $y_{n,1}'[m], \ldots, y_{n,S}'[m]$ are obtained (see FIG. 15, step S5). Finally, a corrected signal sequence $y_n'[m]=Y'[n, m]$ of n samples of the segments is determined on the basis of the corrected sub-band signal sequences (see FIG. 15, step S6), which can be achieved, for example, through a simple summation of the corrected sub-band signal sequences (cf. e.g. FIGS. 13 and 14). If all N signal sequences $y_n[m]$ have been corrected in this way, the resulting matrix Y'[n, m] can be further processed in the normal manner (e.g. calculation of a range map and a range-Doppler map for the detection of radar targets).

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    providing a digital baseband signal using a radar receiver, wherein the digital baseband signal comprises a plurality of segments, wherein each segment, of the plurality of segments, is assigned to a chirp of an emitted chirp sequence and each segment, of the plurality of segments, comprises a specific number of samples;
    for each signal sequence of n-th samples of the plurality of segments, wherein n-th denotes a specific sample position within a respective segment of the plurality of segments, performing prior to performing a Fourier transform process:
        detecting interference-affected samples of the signal sequence;
        splitting the signal sequence into two or more sub-band signal sequences, wherein each sub-band signal sequence, of the two or more sub-band signal sequences, is assigned to a frequency sub-band;
        replacing interference-affected samples in the two or more sub-band signal sequences with a value which is based on adjacent samples to obtain corrected sub-band signal sequences; and
        determining a corrected signal sequence of n-th samples of the plurality of segments based on the corrected sub-band signal sequences.

2. The method as claimed in claim 1, wherein determining the corrected signal sequence comprises:
    combining the corrected sub-band signal sequences.

3. The method as claimed in claim 2, wherein combining the corrected sub-band signal sequences comprises:
    adding together the corrected sub-band signal sequences.

4. The method as claimed in claim 2, wherein only those corrected sub-band signal sequences whose signal energy exceeds a threshold value are considered for combining the corrected sub-band signal sequences.

5. The method as claimed in claim 1, wherein replacing the interference-affected samples in the two or more sub-band signal sequences comprises:
    calculating an approximation value based on one or more samples adjacent to a respective one of the interference-affected samples; and
    replacing the respective one of the interference-affected samples with the approximation value.

6. The method as claimed in claim 5, wherein calculating the approximation value comprises:
    calculating a modified value by calculating a mean value from two or more samples adjacent to the respective one of the interference-affected samples and scaling the mean value with a scaling factor.

7. The method as claimed in claim 6,
    wherein scaling the mean value depends on a frequency in a respective frequency sub-band.

8. The method as claimed in claim 1, wherein detecting the interference-affected samples comprises:
    comparing an amount of energy of the samples of the signal sequence with a threshold value, wherein a sample of the samples is detected as interference-affected if the amount of energy exceeds the threshold value.

9. The method as claimed in claim 1, wherein splitting the signal sequence comprises:
    filtering the signal sequence with a filter bank having a plurality of parallel filters which supply the two or more sub-band signal sequences as output signals.

10. The method as claimed in claim 1, further comprising:
    calculating a range-Doppler map based on the corrected signal sequences; and
    detecting one or more radar targets based on the range-Doppler map.

11. The method as claimed in claim 1, further comprising:
emitting a radio-frequency (RF) radar signal which comprises the chirp sequence;
receiving a corresponding RF signal;
converting the RF signal into a baseband signal; and
generating the digital baseband signal based on the baseband signal.

12. A device, comprising:
a radar receiver configured to provide a digital baseband signal, wherein the digital baseband signal comprises a plurality of segments, each segment, of the plurality of segments, is assigned to a chirp of an emitted chirp sequence and each segment, of the plurality of segments, comprises a specific number of samples; and
a computing unit configured to receive the digital baseband signal and which, for each signal sequence of n-th samples of the plurality of segments, where n-th denotes a specific sample position within a respective segment of the plurality of segments, is configured to perform prior to performing a Fourier transform process:
detecting interference-affected samples of the signal sequence;
splitting the signal sequence into two or more sub-band signal sequences, wherein each sub-band signal sequence, of the two or more sub-band signal sequences, is assigned to a frequency sub-band;
replacing interference-affected samples in the two or more sub-band signal sequences with a value which is based on adjacent samples to obtain corrected sub-band signal sequences; and
determining a corrected signal sequence of n-th samples of the plurality of segments based on the corrected sub-band signal sequences.

13. The device as claimed in claim 12, wherein the computing unit, when determining the corrected signal sequence, is configured to:
combine the corrected sub-band signal sequences.

14. The device as claimed in claim 13, wherein only those corrected sub-band signal sequences whose signal energy exceeds a threshold value are considered for combining the corrected sub-band signal sequences.

15. The device as claimed in claim 12, wherein the computing unit, when replacing the interference-affected samples in the two or more sub-band signal sequences, is configured to:
calculate an approximation value based on one or more samples adjacent to a respective one of the interference-affected samples; and
replace the respective one of the interference-affected samples with the approximation value.

16. The device as claimed in claim 15, wherein the computing unit, when calculating the approximation value, is configured to:
calculate a modified value by calculating a mean value from two or more samples adjacent to the respective one of the interference-affected samples and scaling the mean value with a scaling factor,
wherein the scaling of the mean value depends on a frequency in a respective frequency sub-band.

17. The device as claimed in claim 12, wherein the computing unit, when detecting the interference-affected samples, is configured to:
compare an amount of energy of the samples of the signal sequence with a threshold value, wherein a sample of the samples is detected as interference-affected if the amount of energy exceeds the threshold value.

18. The device as claimed in claim 12, wherein the computing unit, when splitting the signal sequence, is configured to:
filter the signal sequence with a filter bank having a plurality of parallel filters which supply the two or more sub-band signal sequences as output signals.

19. The device as claimed in claim 12, wherein the computing unit is further configured to:
calculate a range-Doppler map based on the corrected signal sequences; and
detect one or more radar targets based on the range-Doppler map.

20. The device as claimed in claim 12, wherein the computing unit is further configured to:
emit a radio-frequency (RF) radar signal which comprises the chirp sequence;
receive a corresponding RF signal;
convert the RF signal into a baseband signal; and
generate the digital baseband signal based on the baseband signal.

* * * * *